US010063340B2

(12) United States Patent
Tayloe et al.

(10) Patent No.: US 10,063,340 B2
(45) Date of Patent: Aug. 28, 2018

(54) DYNAMIC RESOURCE ADAPTATION

(71) Applicant: Nokia Solutions and Networks Oy, Espoo (FI)

(72) Inventors: Daniel Tayloe, Phoenix, AZ (US); Jonathan Gross, Gilbert, AZ (US); Brian Hansche, Gilbert, AZ (US); Joseph Lester, Chandler, AZ (US)

(73) Assignee: Nokia Solutions and Networks Oy, Espoo (FI)

( * ) Notice: Subject to any disclaimer, the term of this patent is extended or adjusted under 35 U.S.C. 154(b) by 15 days.

(21) Appl. No.: 14/552,833

(22) Filed: Nov. 25, 2014

(65) Prior Publication Data

US 2016/0150545 A1    May 26, 2016

(51) Int. Cl.
*H04W 72/04* (2009.01)
*H04B 7/00* (2006.01)
(Continued)

(52) U.S. Cl.
CPC ............ *H04L 1/0004* (2013.01); *H04L 1/001* (2013.01); *H04L 2001/0093* (2013.01)

(58) Field of Classification Search
CPC ..... H04W 72/08; H04W 72/04; H04W 92/00; H04W 48/16; H04L 1/0004; H04L 47/30;
(Continued)

(56) References Cited

U.S. PATENT DOCUMENTS

| 9,131,490 B2 * | 9/2015 | Feng ..................... H04L 5/0007 |
| 2010/0098020 A1 * | 4/2010 | Kim ..................... H04L 1/0027 370/330 |

(Continued)

FOREIGN PATENT DOCUMENTS

| JP | 2009/219010 A | 9/2009 |
| JP | 2011/041193 A | 2/2011 |

(Continued)

OTHER PUBLICATIONS

"PDCCH Dimensioning", H. Lei, Nov. 4, 2014, 11 pgs.
(Continued)

*Primary Examiner* — Edan Orgad
*Assistant Examiner* — Vanneilian Lalchinthang
(74) *Attorney, Agent, or Firm* — Harrington & Smith

(57) ABSTRACT

In a cell where messages having a message type are sent without knowledge of radio frequency conditions for individual ones of user equipment within the cell, measured radio frequency conditions are accessed of multiple user equipment within the cell. Based on the measured radio frequency conditions, a minimum control channel coding rate is determined for a control channel for messages having the message type. Subsequent to a determination of the minimum control channel coding rate, transmission is caused toward all user equipment in the cell of the messages having the message type using the determined minimum control channel coding rate for the control channel. Methods, apparatus, computer programs, and program products are disclosed. The methods may be performed by a base station, self-organizing network server, or other apparatus.

18 Claims, 6 Drawing Sheets

(51) Int. Cl.
*H04W 92/00* (2009.01)
*H04L 1/00* (2006.01)

(58) Field of Classification Search
CPC ............. H04L 1/001; H04L 2001/0093; H04L 5/0053; H04B 7/00
USPC ........................................................ 370/329
See application file for complete search history.

(56) References Cited

U.S. PATENT DOCUMENTS

| | | | |
|---|---|---|---|
| 2010/0236813 A1 | 9/2010 | Nordin et al. | |
| 2011/0269492 A1* | 11/2011 | Wang ................. | H04L 5/003 455/509 |
| 2012/0033650 A1* | 2/2012 | Ahn ................... | H04L 5/0053 370/336 |
| 2012/0034945 A1* | 2/2012 | Wang ................. | H04L 5/003 455/515 |
| 2013/0163543 A1* | 6/2013 | Freda ................ | H04W 72/0406 370/329 |
| 2013/0188505 A1* | 7/2013 | Nory .................. | H04L 5/0053 370/252 |
| 2013/0336252 A1* | 12/2013 | Hsieh ................. | H04L 5/0053 370/329 |
| 2015/0029984 A1* | 1/2015 | Wang ................. | H04L 5/003 370/329 |
| 2015/0043496 A1* | 2/2015 | Kim ................... | H04L 5/0007 370/329 |

FOREIGN PATENT DOCUMENTS

| | | |
|---|---|---|
| JP | 2013/511172 A | 3/2013 |
| JP | 2013/511229 A | 3/2013 |
| WO | WO 2013/046502 A1 | 4/2013 |

OTHER PUBLICATIONS

"3$^{rd}$ Generation Partnership Project; Technical Specification Group Radio Access Network; Evolved Universal Terrestrial Radio Access (E-UTRA); Physical layer procedures (Release 12), Section 5.1.1.1", 3GPP TS 36.213 V12.3.0, 10 pgs.

* cited by examiner

| MCS Index | AWGN C/I for PDCCH symbols | | |
|---|---|---|---|
| | 1 | 2 | 3 |
| 0 | -7.785 | -7.376 | -6.925 |
| 1 | -6.383 | -5.963 | -5.498 |
| 2 | -5.367 | -4.936 | -4.459 |
| 3 | -3.900 | -3.450 | -2.950 |
| 4 | -2.839 | -2.373 | -1.852 |
| 5 | -1.612 | -1.121 | -0.571 |
| 6 | -0.652 | -0.138 | 0.440 |
| 7 | 0.368 | 0.910 | 1.523 |
| 8 | 1.138 | 1.704 | 2.346 |
| 9 | 1.853 | 2.443 | 3.115 |
| 11 | 2.653 | 3.274 | 3.984 |
| 12 | 3.765 | 4.433 | 5.201 |
| 13 | 4.687 | 5.399 | 6.219 |
| 14 | 5.562 | 6.318 | 7.194 |
| 15 | 6.605 | 7.418 | 8.365 |
| 16 | 7.407 | 8.268 | 9.273 |
| 18 | 7.800 | 8.685 | 9.720 |
| 19 | 8.949 | 9.908 | 11.034 |
| 20 | 10.065 | 11.101 | 12.321 |
| 21 | 10.795 | 11.882 | 13.166 |
| 22 | 11.694 | 12.848 | 14.213 |
| 23 | 12.758 | 13.992 | 15.456 |
| 24 | 13.808 | 15.125 | 16.690 |
| 25 | 14.849 | 16.250 | 17.917 |
| 26 | 15.538 | 16.995 | 18.732 |
| 27 | 16.096 | 17.599 | 19.392 |
| 28 | 19.498 | 21.291 | 23.436 |

FIG. 5

DYNAMIC RESOURCE ADAPTATION

TECHNICAL FIELD

This invention relates generally to wireless communication and, more specifically, relates to dynamic adaptation of resources such as control channel information.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, prior to the claims.

In a cellular communication system, multiple users attempt to simultaneously access a radio access network (RAN) wirelessly via their user equipment (UE). The RAN for an LTE system is implemented in an eNB. Uplink and downlink user data is passed between the RAN and the UE, and the RAN needs to transmit the uplink and/or downlink data assignments via the PDCCH channel.

The PDCCH comprises a limited number of control channel elements (CCEs) which may be configured in groups of 1, 2, 4, or 8 as a function of the coding rate that is needed for reliable transmission to the UE. Using more CCEs results in more reliable transmission (e.g., lower coding rate) but consumes more capacity. The total number of PDCCH CCEs available depends on the system bandwidth and the number of symbols configured for use by the PDCCH, where the maximum number is limited by the LTE standard.

Since both uplink and downlink transmissions require use of the PDCCH, and since the capacity of the PDCCH is limited, the PDCCH is a critical capacity bottleneck within the LTE system. This fact is well recognized within the cellular industry.

Some customers of cellular equipment demand very high LTE-connected UE capacity, with customers demanding 1000 or more RRC-connected UEs per cell/carrier. Work is being performed on features to increase the connected UE capacity in current and future LTE releases to meet these demands.

As the connected UE capacity increases, the PDCCH may quickly become a significant capacity and performance bottleneck. This is due to the need to schedule, using the PDCCH, both user data (DTCH) as well as periodic control information (DCCH, CCCH)—such as status PDUs, time alignment commands, buffer status reports, and other information—to each connected UE, where each of these scheduling events to each connected UE requires PDCCH capacity.

It would be beneficial to improve use of PDCCH as the connected UE capacity increases in a cell, e.g., to avoid or lessen the severity of PDCCH capacity bottlenecks.

BRIEF SUMMARY

This section is intended to contain examples and is not meant to be limiting.

An example method comprises: accessing, in a cell where messages having a message type are sent without knowledge of radio frequency conditions for individual ones of user equipment within the cell, measured radio frequency conditions of multiple user equipment within the cell; determining, based on the measured radio frequency conditions, a minimum control channel coding rate for a control channel for messages having the message type; and causing, subsequent to a determination of the minimum control channel coding rate, transmission toward all user equipment in the cell of the messages having the message type using the determined minimum control channel coding rate for the control channel.

An additional example embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example apparatus includes one or more processors and one or more memories including computer program code. The one or more memories and the computer program code are configured to, with the one or more processors, cause the apparatus to perform at least the following: accessing, in a cell where messages having a message type are sent without knowledge of radio frequency conditions for individual ones of user equipment within the cell, measured radio frequency conditions of multiple user equipment within the cell; determining, based on the measured radio frequency conditions, a minimum control channel coding rate for a control channel for messages having the message type; and causing, subsequent to a determination of the minimum control channel coding rate, transmission toward all user equipment in the cell of the messages having the message type using the determined minimum control channel coding rate for the control channel.

A further example embodiment is an apparatus comprising: means for accessing, in a cell where messages having a message type are sent without knowledge of radio frequency conditions for individual ones of user equipment within the cell, measured radio frequency conditions of multiple user equipment within the cell; means for determining, based on the measured radio frequency conditions, a minimum control channel coding rate for a control channel for messages having the message type; and means for causing, subsequent to a determination of the minimum control channel coding rate, transmission toward all user equipment in the cell of the messages having the message type using the determined minimum control channel coding rate for the control channel.

An example computer program product includes a computer-readable storage medium bearing computer program code embodied therein for use with a computer. The computer program code includes: code for accessing, in a cell where messages having a message type are sent without knowledge of radio frequency conditions for individual ones of user equipment within the cell, measured radio frequency conditions of multiple user equipment within the cell; code for determining, based on the measured radio frequency conditions, a minimum control channel coding rate for a control channel for messages having the message type; and code for causing, subsequent to a determination of the minimum control channel coding rate, transmission toward all user equipment in the cell of the messages having the message type using the determined minimum control channel coding rate for the control channel.

BRIEF DESCRIPTION OF THE DRAWINGS

In the attached Drawing Figures:

FIG. 5 is an example of AWGN SINR table for an example of DL MCSs in use; and

DETAILED DESCRIPTION OF THE DRAWINGS

The examples of embodiments herein describe techniques for, e.g., dynamic PDCCH (e.g., and other control channel) adaptation of overhead messaging to RAN loading. Additional description of conventional techniques and techniques for dynamic PDCCH adaptation is presented after one possible system into which some of the examples of the embodiments may be used is described.

Figure 1:
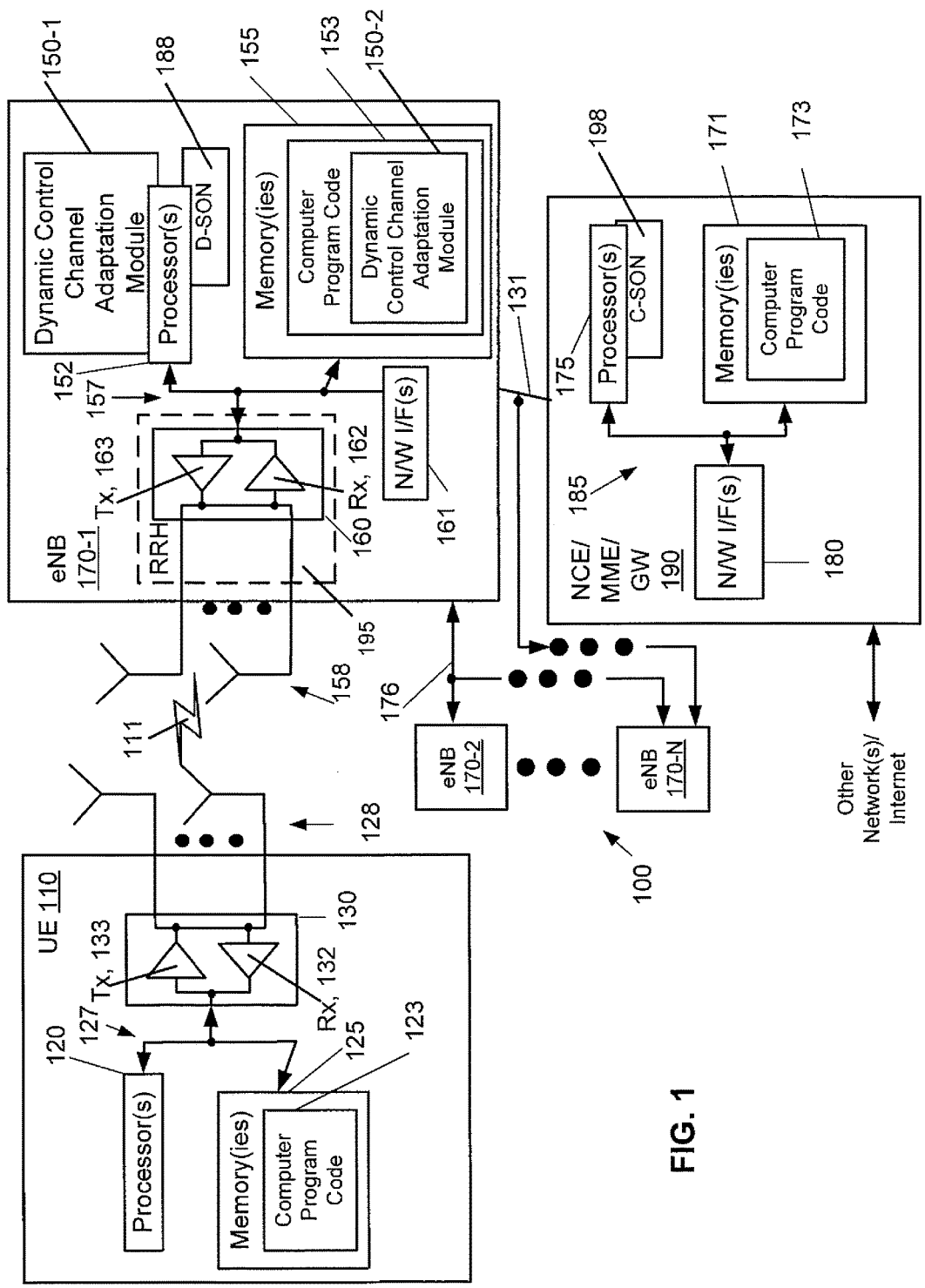
FIG. 1 is a block diagram of a possible example of a system in which some examples of embodiments may be practiced.

Turning to FIG. 1, this figure shows a block diagram of an example of a system in which some examples of embodiments may be practiced. In FIG. 1, a UE 110 is in wireless communication with a wireless network 100. The user equipment 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 communicates with eNB 170-1 via a wireless link 111.

The eNBs 170 are base stations that provide access by wireless devices such as the UE 110 to the wireless network 100. In this example, there are N eNBs 170, of which only some parts of the internal portions of eNB 170-1 are shown. A single eNB will be referred to as "eNB 170" and multiple eNBs will be referred to as "eNBs 170". An eNB 170 (as illustrated by eNB 170-1) includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The eNB 170 includes a dynamic control channel (e.g., PDCCH and possibly PDSCH) adaptation module 150, comprising one of or both parts 150-1 and/or 150-2, which may be implemented in a number of ways. The dynamic control channel adaptation module 150 may be implemented in hardware as dynamic control channel adaptation module 150-1, such as being implemented as part of the one or more processors 152. The dynamic control channel adaptation module 150-1 may be implemented also as an integrated circuit or through other hardware such as a programmable gate array. In another example, the dynamic control channel adaptation module 150 may be implemented as dynamic control channel adaptation module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

It is noted that a cell makes up part of an eNB. That is, there can be multiple cells per eNB. For instance, there could be three cells for a single eNB carrier frequency and associated bandwidth, each cell covering one-third of a 360 degree area so that the single eNB's coverage area covers an approximate oval or circle. Furthermore, each cell can correspond to a single carrier and an eNB may use multiple carriers. So if there are three 120 degree cells per carrier and two carriers, then the eNB has a total of six cells.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

The wireless network 100 may include a network control element (NCE) 190 that may include MME/SGW functionality, and which provides connectivity with a further network, such as a telephone network and/or a data communications network (e.g., the Internet). The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The techniques described herein may run at an eNB 170 (such as eNB 170-1), but could also be made to run remotely as a D-SON/C-SON application as long as the required statistics can be collected from the eNBs. For instance, the D-SON server 188 in the eNB 170 or the C-SON server 198 could perform operations described herein and access/receive RF statistics from an eNB 170 or multiple eNBs 170, configure the eNB(s) 170 with the corresponding control channel (e.g. PDCCH) and data bearing channel (e.g. PDSCH) coding rates, and cause the eNB(s) 170 to transmit on the PDCCH and PDSCH using associated coding rates. The D-SON server 188 and the C-SON server 198 could be implemented as software, as hardware, or as a combination of both software and hardware. The D-SON server 188 may be considered to be separate from (but perhaps implemented within) the eNB 170, such that the D-SON has to receive RF data from the eNB, determine the PDCCH and PDSCH coding rates, send the determined PDCCH and PDSCH coding rates to the eNB, and cause the eNB to use the PDCCH and PDSCH coding rates. However, the implementation could be more tightly coupled in order to speed up the adaptation. The C-SON server 198 can gather information from many eNBs 170. The C-SON server 198 can also be standardized to work with many vendor's products. A possible disadvantage of the C-SON is it may be slower to adapt to changing conditions than would a D-SON.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples.

As stated above, there is a control channel (e.g. PDCCH) capacity bottleneck in certain situations. Given this capacity bottleneck, it is desirable to have a network node such as a base station or SON node dynamically optimize PDCCH capacity (e.g., and reliability) parameters to improve the performance and PDCCH congestion of these sites as the connected UE loading increases.

A fundamental trade-off exists between capacity and reliability for control channel (e.g. PDCCH) transmissions. As PDCCH reliability over the RF channel is increased, the PDCCH capacity is reduced (e.g., so scheduling rates must be reduced). Conversely, as PDCCH RF reliability is reduced, PDCCH capacity is increased (e.g., so scheduling rates can be increased).

Figure 2:
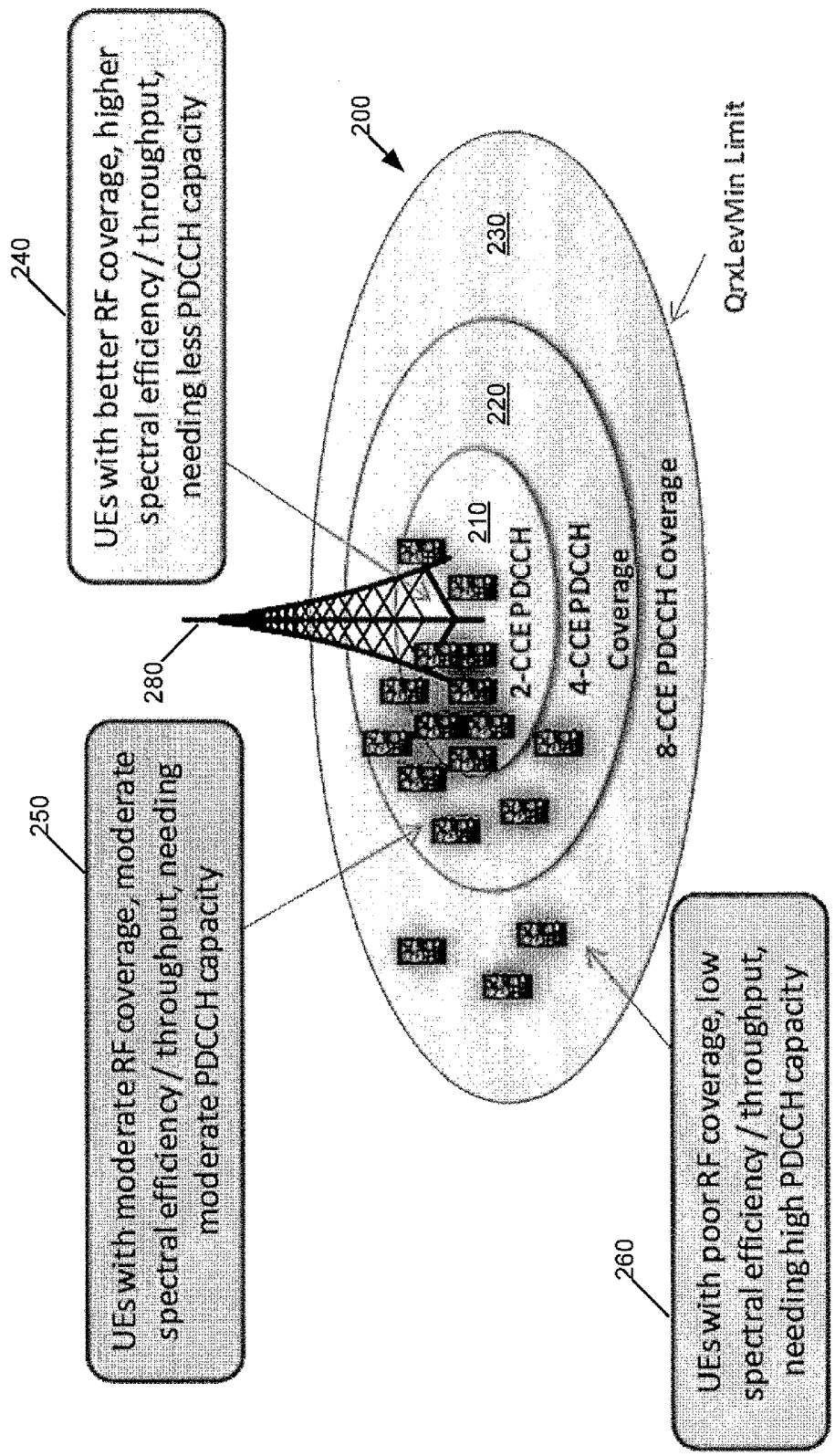
FIG. 2 is an illustration of an example of coverage versus PDCCH capacity.

An example of a relationship between PDCCH capacity, coverage, and throughput (spectral efficiency) is illustrated by FIG. 2. FIG. 2 is a generic coverage diagram and illustrates theoretical relationships. A cell 200 (illustrated by an oval here, but the oval could actually be three cells as described above) is illustrated and surrounds a tower 280 having antennas 158 (not shown in FIG. 2). A 2-CCE PDCCH coverage is assigned to UEs 110 in area 210. These UEs 110, as illustrated by reference 240, are UEs with better RF coverage, with higher spectral efficiency/throughput, and needing less PDCCH capacity. A 4-CCE PDCCH coverage is assigned to UEs 110 in area 220. These UEs 110, as illustrated by reference 250, are UEs with modern RF coverage, with moderate spectral efficiency/throughput, and needing moderate PDCCH capacity. An 8-CCE PDCCH coverage is assigned to UEs 110 in area 230. These UEs 110, as illustrated by reference 260, are UEs with poor RF coverage, with low spectral efficiency/throughput, and needing high PDCCH capacity. The QrxLevMin limit is also shown, which is a parameter that indicates the minimum required signal strength in the cell 200.

FIG. 2 is described as illustrating theoretical relationships, because messages where the RF conditions of the target UE(s) are unknown are sent using a most conservative selection (i.e., 8 CCEs) for PDCCH coding rate. That is, a system default is to normally use 8 CCEs all the time. That is the most conservative selection. Thus, even though what is shown in FIG. 2 is theoretically possible, only the most conservative selection of 8 CCEs is actually used for all UEs 110 in a cell for the message types being described herein. By contrast, in an example, what we are trying to determine from the PDCCH point of view is if coverage of 99 percent (for example) of the users in a cell can be accomplished with, e.g., 4 CCEs, or if 8 CCEs is needed.

Specifically, some examples of embodiments herein may dynamically optimize a trade-off between a cell's RF coverage and its capacity via optimization of control channel capacity related parameters as a function of cell loading. This allows maximizing both the number of connected UEs and the volume of data traffic carried by the cell, thus maximizing the operator's data traffic revenue.

For instance, the PDCCH channel carries messages that use "generic" or "in the blind" encoding because the RF conditions of the target UE(s) is unknown. This includes paging, cell broadcast (BCCH), group power control (GPC), and/or initial call set up messaging. In order to provide the best coverage, these messages are sent using 8 (eight) CCEs which provides the best coding rate to the target UEs. However, the use of a PDCCH aggregation level of 8 CCEs is a high impact to the PDCCH channel capacity, especially for a busy site. In addition, the PDSCH encoding of these messages can likewise be encoded for wide area coverage which can take up a lot of PDSCH PRB resources if not needed.

Current LTE systems are capable of dynamically changing the PDCCH capacity via functionality such as dynamic management of the PDCCH CCE capacity via PCFICH CFI (e.g., the number of symbols used for PDCCH).

Additionally, C-SON and D-SON have systems for managing system load related to functions such as MLB. MLB manages the number of connected UEs per cell to more evenly distribute the connected UE loading over multiple cells and thus achieve lower "peak cell" PDCCH loading. However, these systems will tend to place UEs in cells that have lower connected UE loading but poorer RF conditions. As a result, UEs moved via MLB may tend to required more CCE capacity (e.g., high CCE aggregation levels) which in turn may consume more PDCCH capacity in the cell to which UEs are offloaded (via cell specific offsets), which at the overall system level may increase total PDCCH loading. Thus, as MLB balances the load between cells, MLB may cause the PDCCH to start to become a bottleneck in previously under-loaded cells. Some examples of embodiments herein complement MLB by making more efficient use of the control channel (e.g. PDCCH) resources.

One idea herein is to measure the RF conditions of some of the UEs within the eNB 170 (that is, within cell(s) of the eNB) and use those measurements to determine a minimum PDCCH CCE aggregation level and a minimum PDSCH coding rate for messages sent without knowledge of the RF conditions of the UEs. The UEs, for instance, could be randomly selected. The messages sent without knowledge of the RF conditions of the UEs are 'common' messages, where one message is sent to all UEs in the cell. As previously described, since each UE has different RF conditions, the eNB has to assume the worst-case RF conditions, i.e., the lowest common denominator. Examples of such messages, as also described above, are paging, cell broadcast (BCCH), group power control (GPC) and initial call set up. In some examples herein, the RF conditions of all of the UEs are known as a collection, but the RF condition is not known for individual UEs. That is, embodiments may use the RF conditions of the collection of UEs in the cell, without knowing the RF conditions of the individual UEs that are receiving the common message.

Certain of the examples herein may provide most benefit in a highly loaded cell, where the PDCCH channel capacity could be a bottleneck. The examples also have a secondary impact of decreasing the loading on the PDSCH by reducing the coding rates if allowed by the current RF conditions. From what has been seen in highly loaded "train station" scenarios, PDCCH capacity is more of a bottleneck than PDSCH capacity. Thus, the improvement on the PDCCH channel is what may be really important and the techniques herein concerning the coding rate improvements on the PDSCH might be skipped, but the techniques herein would still be very beneficial.

Some examples of embodiments may improve on earlier solutions in that they allow for automatic determination of the needed PDCCH and PDSCH coding rate for messages sent with no knowledge of the RF conditions of individual ones of the targeted UEs. This PDCCH/PDSCH coding rate is then a function of the unique RF environment of each cell and the desired delivery reliability of these messages. An embodiment herein not only picks the number of PDCCH CCEs to be used, but also tries to reduce the PDSCH coding rate (e.g., reduce the number of PRBs used) as well. This leaves more PDSCH PRBs for real data traffic which may mean higher DL throughput due to the reduced PRB usage for, e.g., paging, initial call setup, and broadcast.

Before proceeding with some examples of embodiments, a note is made about terminology. For a control channel of PDCCH, the terms "PDCCH coding rate" or "PDCCH CCE aggregation level" are both used herein. These terms are considered to be equivalent herein. A specific PDCCH CCE aggregation level is tied to a specific coding rate for a given PDCCH DCI format (all the formats tend to have different payload sizes, and thus different coding rates), and a specific coding rate specifies a needed SINR.

An example of an embodiment has the following steps.
1) Set a default operating point (conservative).
2) Gather RF statistics.
3) Determine the desired distribution tail operating point from the RF statistics.
4) Determine adjustments needed from (3) based on delivery reliability and HARQ like repetition for a targeted message.
5) Determine the PDCCH aggregation level and PDSCH coding rate for the targeted message.

Figure 3:
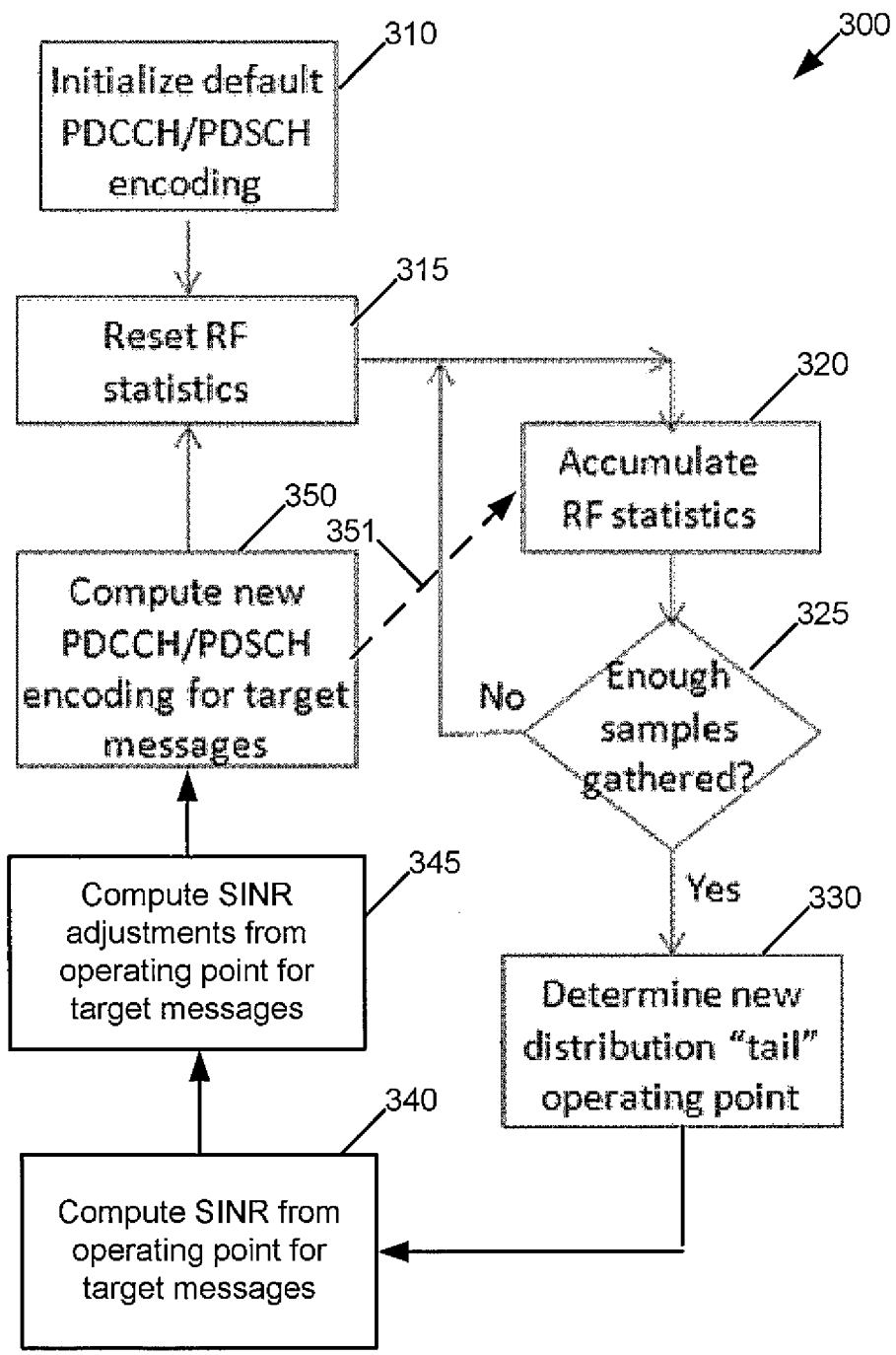
FIG. 3 is a logic flow diagram for dynamic resource adaptation such as PDCCH adaptation of overhead messaging to RAN loading, and illustrates the operation of an example of a method, a result of execution of computer program instructions embodied on a computer readable memory, functions performed by logic implemented in hardware, and/or interconnected means for performing functions in accordance with an example of an embodiment.

A more specific example of an embodiment may be understood by reference to FIG. 3, which is a logic flow diagram for dynamic resource adaptation such as PDCCH adaptation of overhead messaging to RAN loading. FIG. 3 illustrates the operation of an example of a method, a result of execution of computer program instructions embodied on a computer readable memory, functions performed by logic implemented in hardware, and/or interconnected means for performing functions in accordance with an example of an embodiment. FIG. 3 is performed by a base station such as eNB 170, e.g., under control at least in part by dynamic control channel adaptation module 150. It is noted that while FIG. 3 is characterized as being performed by a base station, the blocks in FIG. 3 and other embodiments herein may be performed by a smaller apparatus than a base station, such as a SON server or a module such as a programmed processor or a specially programmed integrated circuit. Such apparatus may make up part of the base station. Note that FIG. 3 is typically performed on a per-cell basis.

The flow 300 starts in block 310, where the eNB 170 initialize default encoding, for example, for PDCCH/PDSCH. Block 310 corresponds to step (1) above. In block 310, RF statistics are reset. In block 320, the eNB 170 accumulates RF statistics. If the eNB 170 determines that not enough samples have been gathered (block 325=No), the flow 300 proceeds to block 320. Blocks 315, 320, and 325 correspond to step (2) above.

If the eNB 170 determines that enough samples have been gathered (block 325=Yes), the flow 300 proceeds to block 330. In block 330, the eNB 170 determines a new distribution "tail" operating point. One example of block 325 is based on statistical significance. That is, enough samples are accumulated to reduce a variance of the average. Other techniques may be used, however. Block 330 is an example implementing step (3) above. The first time block 330 is entered, a (first) new distribution tail operating point is determined. Subsequent entries into block 330 determine additional operating points. In block 340, the eNB 170 computes an SINR from the operating point for target messages. Block 340 is an example of an implementation of step (3) above. In block 345, the eNB 170 computes SINR adjustments from the operating point (e.g., from the SINR) for target messages. This corresponds to step (4) above. In block 350, the eNB 170 computes new PDCCH/PDSCH encoding for target messages. Block 350 is an example of an implementation of step (5) above. The flow 300 continues to block 315, where the RF statistics are reset. In some examples of embodiments, resetting the RF statistics has a benefit of determining RF statistics without influence from conditions that were accumulated "too long" ago. However, one may also not reset the RF statistics and instead continue to accumulate the RF statistics (see arrow 351), such as performing a time-weighted average of the RF statistics. For example, the time-weighting may be applied where the newest RF statistics are given the highest weight and the weights applied to RF statistics accumulated in previous times decrease as times move from a current time to previous times. At some previous time from the current time, the weight will be zero.

Additional description of the steps above and also of the blocks in FIG. 3 is now presented. Concerning step (1) and block 310 of FIG. 3, this operation is important as it may take a long time to gather enough statistically significant data points in step (2) and blocks 320 and 325 in order to determine a distribution that is reliable. This is especially important since one technique for performing step (2), determining a tail of a distribution, nominally the one percent point, needs a lot of samples. Step (2) may need to have a threshold (e.g., implemented as block 325) for a total number of UEs 110 sampled or a threshold number of samples at the one percent (as an example) distribution tail point in order to make a good determination of the conditions at this tail end (nominally one percent) operating point.

This may imply that a lightly loaded site may take a very long time to get through step (2) (blocks 320 and 325) and thus have a default, nominally conservative operating point for a relatively long time. This is not really an issue, because it is expected that a lightly loaded site will have excess capacity, making the techniques herein possibly less important. The techniques described herein may be most important in a highly loaded cell where the PDCCH channel capacity could be a bottleneck. In a highly loaded cell, step (2) and corresponding blocks 320 and 325 will be able to be satisfied much more quickly. Once step (2) is satisfied, those results can be held onto as the statistic accumulation of step (2) is restarted for the next update of the RF conditions.

The RF condition (step (2) above and also blocks 320 and 325 of FIG. 3) of the cell may be determined via several techniques:

Accumulate the DL MCS usage distribution;
Accumulate the CQI distribution;
Accumulate the UL pathloss distribution; and/or
Accumulate SRS SINR distributions.

The DL MCS usage distribution can be used in conjunction with a desired delivery reliability target (such as one percent failure) to determine a minimum PDCCH CCE aggregation level and PDSCH coding rate. For example, in an eNB with good RF conditions, the one percent tail of the MCS distribution (step (3), block 330) might be MCS 9. MCS 9 can be mapped to a SINR (step (3), block 340). This SINR can then provide the basis of the desired PDCCH and PDSCH encoding on a message-type-by-message-type basis.

The CQI distribution has less granularity than the MCS, but since the CQI distribution also can be mapped to a SINR, the tail of the distribution (such as the one percent point—step 3, block 330) can also be used like the MCS case above to determine a cell-wide a one percent SINR. Like the MCS case, this can be used as the basis for determining PDCCH and PDSCH encoding for messages sent "in the blind" such as paging, BCCH, GPC and call set up (for PDCCH) and paging, BCCH, and call set up (for PDSCH) messages as described above.

The UL pathloss can be calculated on a UE-by-UE basis by looking at the PUSCH MCS and the number of PRBs used when a power headroom report (PHR) is received. This pathloss estimate is a bit better if the received SINR can be used instead of the estimated SINR from the MCS used. The equations in 3GPP TS 36.213, section 5.1.1.1, can be used to derive the UL pathloss. If the pathloss distribution is kept across all UEs using these pathloss calculations, the tail of the distribution (such as the one percent point) can be kept. Using this one percent point (for example—step (3), block 330) combined with the known DL transmit power per PDSCH PRB, a DL SINR can be derived assuming no interference. A margin for DL interference (such as four to six dB) might need to be subtracted from this one percent SINR point.

Likewise, the UL pathloss can be estimated from the received SRS SINR and the number of PRBs in use for the SRS measurement. Once a pathloss distribution using the SRS signals has been determined, the tail of the distribution for the one percent point (for example—step (3), block 330) and a DL per PRB SINR can be computed as given above for the PUSCH/PHR case.

All four of these methods (or combinations of the above) can be used to find an appropriate one percent (as an example of a suitable point) DL SINR operating point. Of these four methods, the MCS method could be the most accurate, but the other methods are useful, too. The following comments therefore assume that the MCS method was used.

Regarding step (4) and block 345, firstly, since the DL MCS is typically selected based on a 10% (ten percent) BLER, if the end delivery reliability is different than 10% for the first transmission, the 1% (one percent) tail distribution will need to be shifted. For example, a page message might be sent once, requiring a 1% first delivery failure as opposed to the 10% that was used on the PDSCH when the MCS data was gathered. Since the link curves for various PDCCH CCE aggregation levels are readily measured, there is an easy determination of SINR offset to determine the SINR difference between a 10% and a 1% failure rate SINR in dB. A link curve, e.g., shows the reliability (or expected error rate) of the transmission as a function of the SINR (or RF conditions).

Secondly, the effect of retransmissions also needs to be taken into account. For example, the BCCH messages are normally sent using four different HARQ like redundancy versions. Thus there is a nominal 6 dB ($10*\log_{10}(4)$) improvement in the required SINR for these messages. This redundancy means that one can lower (in terms of CCEs used) the CCE PDDCH coverage because the redundancy results in improved SINR.

Thirdly, some of these messages have PDCCH limitations. For example paging, GPC, and BCCH messages must be sent using either 4 or 8 CCE PDCCH aggregation levels. However, call set up messaging has no such restrictions and can use 1, 2, 4, or 8 PDCCH CCE aggregation levels.

Thus, for each message type, a PDCCH CCE aggregation level and PDSCH encoding can be determined based on the characteristics of each message. Some examples of these characteristics are given below:

Paging: Sent once, requires one percent delivery reliability, limited to either 4 or 8 PDCCH CCEs.

BCCH: Sent four times and requires one percent delivery reliability after the fourth transmission, limited to either 4 or 8 PDCCH CCEs.

GPC: Sent once, requires one to 10 percent delivery reliability, limited to either 4 or 8 PDCCH CCEs.

Call Set Up messaging: Sent several times, needs two percent delivery reliability after the first transmission, all PDCCH aggregations levels (1, 2, 4, or 8 CCEs) are usable.

An example is now presented to help illustrate concepts in the blocks in FIG. 3 and the steps presented above. It is noted that this example is a conceptual one and not necessarily an actually implemented example. In step (1) and block 310 of FIG. 3, a default encoding is initialized. For a particular message type, a conservative use of 8 CCE PDCCH coding rate is used, as this provides the best coverage assuming no knowledge of RF conditions is known.

Figure 4:
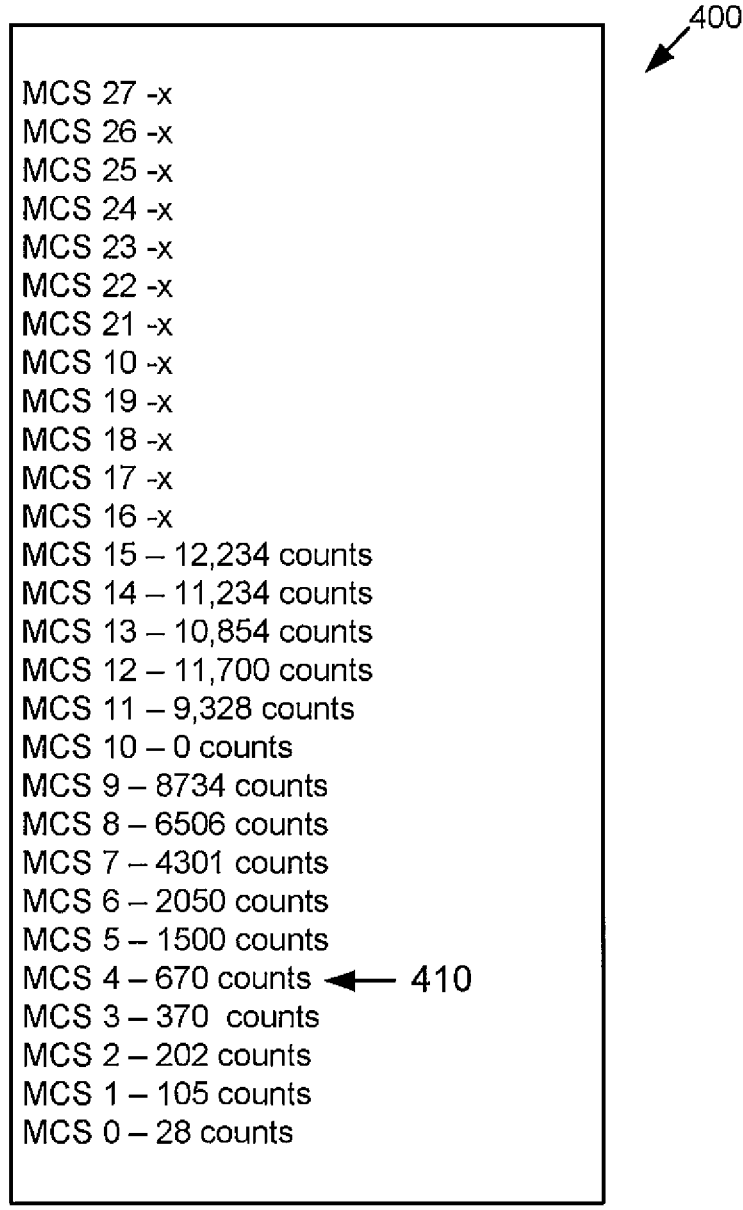
FIG. 4 is an example of accumulated RF statistics.

Step (2) and blocks 320 and 325 accumulate RF statistics. FIG. 4 is an example of accumulated RF statistics, in a list 400. This example uses MCS, and there are counts for MCSs from zero to 27. An "x" for a count indicates there are no counts for that MCS. A count indicates how many times that MCS was used for UEs 110 in the cell.

In step (3) and block 330, a new tail distribution operating point is determined. Assume that one picked 1% (one percent) as the target MCS threshold. Note that the 1% is selected because this allows coverage of for 99% (for example) of the users in a cell. There are a total of 79,816 counts in the list 400. From this, the 1% point would be a count of 798. Summing from the bottom of the list 400, 798 would include MCSs 0, 1, 2, 3, 4 and the sum overflows the 1% point with MCS 4. Thus the 1% point 410 would be MCS 4.

For step (3) and block 340, suppose one had AWGN SINR table for the DL MCSs in use. Such a table might look like the version shown in FIG. 5. For this table 500, each MCS index corresponds to three AWGN C/I for PDCCH symbols, where one, two, or three symbols are used. With this table 500, MCS 4 is illustrated by reference 510 and corresponds to a SINR of −2.839, −2.373, or −1.852, depending on if the PDCCH used 1, 2 or 3 symbols.

Likewise, one may have a SINR table for different PDCCH transmission formats. Often, DCI format 2 is used and there are other formats and each format has its own SINR table. For DCI format 2, the SINR table is the following:

1 CCE: 7.2 dB
2 CCEs: 3.0 dB
4 CCEs: 0 dB
8 CCEs: −2.5 dB

Notice that in this case, MCS 4 with a SINR of −2.373 dB (PDCCH=2 symbols, see reference 520) is less than the SINR required for 4 CCEs by about −2.3 dB. Thus, 8 CCEs would need to be used. This is step (5) and block 350. If the 1% point had been MCS 7 (0.9 dB for PDCCH=2 symbols, see reference 530), then 4 CCEs could have been used instead. For broadcast messages, one only has the choice of using either 4 or 8 CCEs.

So from the 1% (for example) MCS distribution, we get the MCS we want to use directly (MCS 4 above), then from the SINR associated with that MCS, we can use that SINR to select a PDCCH aggregation level based off the SINR requirements for the specific PDCCH message format being used (such as DCI format 2).

Thus, all messages having a specific type would be sent at the same PDSCH MCS coding rate and PDCCH CCE aggregation level. However, broadcast messages are different from other messages. Some of these broadcast messages are sent once, some are sent four times. A message sent only once is treated as discussed in the example above. If a message is sent four times (for example) then the message could take credit for up to 10*log 10(# repeats) or 6 dB in SINR for four repeats. We may not take credit for a 6 dB in this case, but if we took credit for 3 dB out of the 6 dB (for example), the required SINR would be 3 dB higher for both the MCS and the PDCCH aggregation level compared to what is discussed in the example above. That is, in step (4) or block 350, for the example of MCS 4 with a SINR of −2.373 dB (PDCCH=2 symbols, see reference 520), 8 CCEs would need to be used without considering the repetition. Considering the repetition, the required SINR is 3 dB higher and therefor −2.3 dB+3 dB is 0.7 dB, and therefore 4 CCEs may be used instead of 8 CCEs. For the example where the 1% point had been MCS 7 (0.9 dB for PDCCH=2 symbols, see reference 530), then 4 CCEs could have been used without considering the repetition. IF the repetition is considered, then one would have 0.9 dB+3 dB, or 3.9 dB, and theoretically 2 CCEs may be used. However, only 4 CCEs may be used because of the message type.

Regarding a PDSCH scenario, this may have its own per-UE specific link adaptation method. However the starting point for that link adaptation today is fixed for all UEs. The starting point is a parameter that sets the starting MCS or link adaptation point. Using one or more of the techniques presented herein, this can be improved. Specifically, one can use the methods herein to pick an "intelligent" starting point for the PDSCH. That is, the PDSCH coding rate is adapted automatically for each UE. However, when first starting out, the algorithm does not know the RF conditions (i.e., the algorithm has not had a chance to adapt yet), so the algorithm starts out with a very conservative value. An example embodiment herein allows one to start with a less conservative value. The same examples provided above are applicable, but instead of using the SINR to pick the CCE, the SINR is used to pick the starting point.

Figure 6:
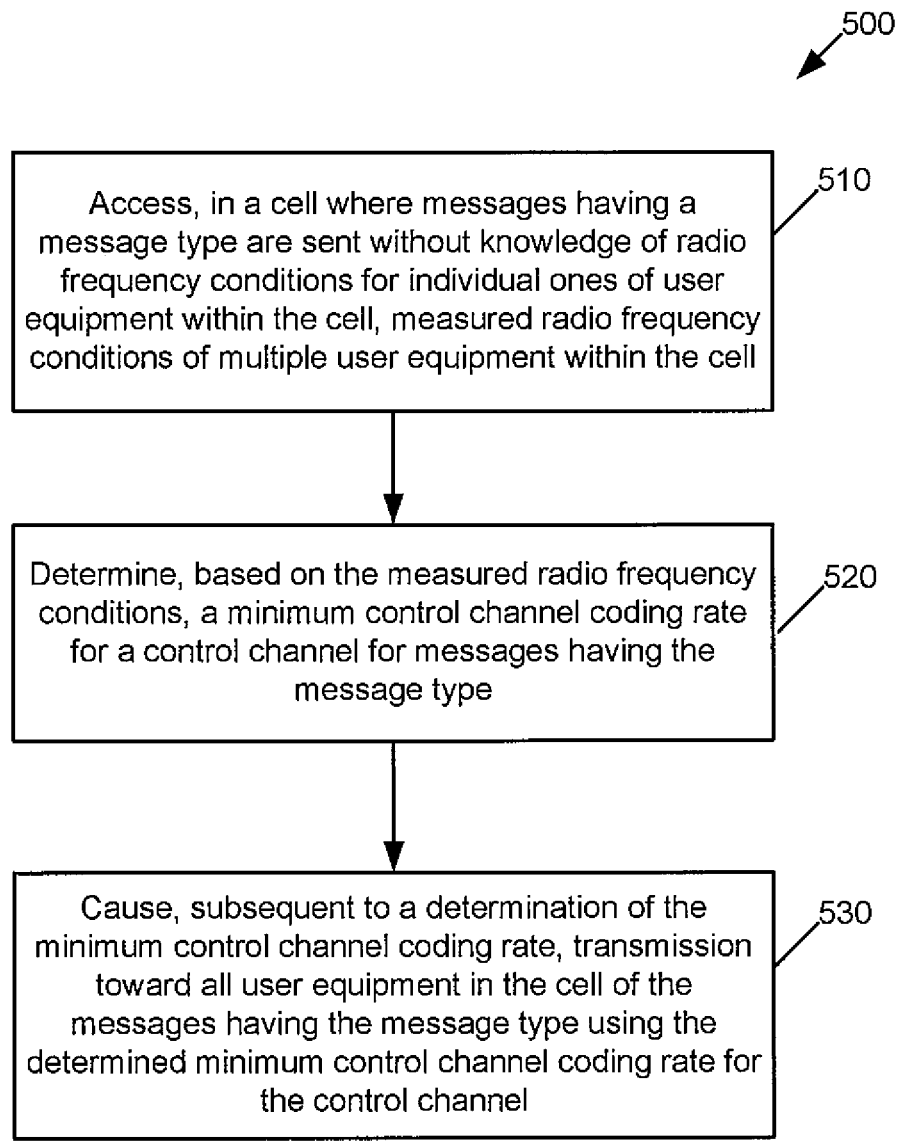
FIG. 6 is a logic flow diagram for dynamic resource adaptation, and illustrates the operation of an example of a method, a result of execution of computer program instructions embodied on a computer readable memory, functions performed by logic implemented in hardware, and/or interconnected means for performing functions in accordance with an example of an embodiment.

Turning to FIG. 6, this figure is a logic flow diagram for dynamic resource adaptation. This figure illustrates the operation of an example of a method 500, a result of execution of computer program instructions embodied on a computer readable memory, functions performed by logic implemented in hardware, and/or interconnected means for performing functions in accordance with an example of an embodiment. The blocks in FIG. 6 may be performed by a base station (or smaller module within the base station), such as eNB 170, e.g., under control at least in part by dynamic control channel adaptation module 150, or by a SON server 188 or 198, or some apparatus configured to implement the same. Method 500 is also referred to as Example 1.

In block 510, an apparatus accesses, in a cell where messages having a message type are sent without knowledge of radio frequency conditions for individual ones of user equipment within the cell, measured radio frequency conditions of multiple user equipment within the cell. The messages with the message type are sent without knowledge of RF conditions for individual users. That is, the apparatus has no knowledge of an RF condition for a user equipment in the cell. It is noted that the term "user equipment" is a term that can be singular or plural, depending on how term is used. In block 520, the apparatus determines, based on the measured radio frequency conditions, a minimum control channel coding rate for a control channel for messages having the message type. In block 530, the apparatus causes, subsequent to a determination of the minimum control channel coding rate, transmission toward all user equipment in the cell of the messages having the message type using the determined minimum control channel coding rate for the control channel. For instance, an apparatus could cause broadcasting the messages toward all user equipment in the cell.

Example 2

The method of example 1, further comprising setting, without a determination of the radio frequency conditions, an initial control channel coding rate for the control channel for the messages having the message type. The setting is performed prior to the determining of the minimum control channel coding rate, and wherein the determined minimum control channel coding rate replaces the initial control channel coding rate.

Example 3

The method of any one of examples 1 to 2, wherein measuring radio frequency conditions of user equipment within a cell further comprises: accumulating samples of radio frequency statistics until a threshold amount of samples have been gathered; and responsive to a determination the threshold amount of samples have been gathered, performing the determining, based on the measured radio frequency conditions, the minimum control channel coding rate for the control channel for messages having the message type.

Example 4

The method of example 3, wherein accumulating the radio frequency statistics accumulates radio frequency statistics for one or more of the following: downlink modulation and coding scheme usage distribution; channel quality indicator distribution; uplink pathloss distribution; or signal to interference plus noise ratio distribution based on sounding reference signals.

Example 5

The method of any one of examples 3 to 4, wherein: measuring further comprises determining a distribution tail operating point from the accumulated samples; and determining the minimum control channel coding rate further comprises determining, based on the determined distribution tail operating point, the minimum control channel coding rate for the control channel for messages having the message type.

Example 6

The method of example 5, wherein determining the minimum control channel coding rate further comprises computing signal to interference plus noise based on the distribution tail operating point for the message type and determining the minimum control channel coding rate using the computed signal to interference plus noise.

Example 7

The method of example 6, wherein determining the minimum control channel coding rate further comprises adjusting the computed signal to interference plus noise based on a number of times the messages having the message type are sent to all the user equipment in the cell.

Example 8

The method of example 5, wherein the distribution tail operating point is selected so that a certain percentage of user equipment in the cell will be covered by use of the minimum control channel coding rate in response to performing the transmission of the messages having the message type.

Example 9

The method of any one of the previous examples, wherein: the method further comprises, prior to determining the minimum control channel coding rate and prior to causing transmission of the messages having the message type using the determined minimum control channel coding rate for the control channel, setting an initial control channel coding rate, and causing the transmission to all user equipment in the cell the messages having the message type using the initial control channel coding rate; and the determined minimum control channel coding rate is different from the initial control channel coding rate.

Example 10

The method of any one of the previous examples, wherein the control channel is a physical downlink control channel.

Example 11

The method of example 10, wherein the minimum control channel coding rate is one of a plurality of channel control elements aggregation levels.

Example 12

The method of example 11, wherein there are a plurality of different message types, each message type is limited to a number of different channel control elements aggregation levels, and the determining the minimum control channel coding rate for the control channel takes into consideration the number of different channel control elements aggregation levels for the message type.

Example 13

The method of any one of the previous examples, wherein the message type is at least one of the following: paging; broadcast control channel; group power control; and call set up messaging.

Example 14

The method of any one of the previous examples, further comprising: determining, based on the measured radio frequency conditions, a minimum coding rate for a physical downlink shared channel for messages having a second message type suitable for the physical downlink shared channel; and causing transmission, responsive to a determination of the minimum coding rate for the physical downlink shared channel, of messages having the second message type using the determined minimum coding rate for the physical downlink shared channel.

Example 15

The method of example 14, further comprising setting, without a determination of the radio frequency conditions, an initial coding rate for the physical downlink shared channel for messages having the second message type, wherein the setting the initial coding rate for the physical downlink shared channel is performed prior to the determining of the minimum coding rate for the physical downlink shared channel, and wherein the determined minimum coding rate for the physical downlink shared channel replaces the initial coding rate for the physical downlink shared channel.

Example 16

The method of any one of examples 14 or 15, wherein the second message type is at least one of the following: paging; initial call setup; and broadcast.

Example 17

The method of any one of the previous examples, performed by a base station, wherein the base station measures the radio frequency conditions of the multiple user equipment within the cell prior to accessing the radio frequency conditions and performs transmission of the messages having the message type using the determined minimum control channel coding rate for the control channel.

Example 18

The method of any one of examples 1 to 16, performed by a self-organizing server.

Another example is an apparatus comprising: means for accessing, in a cell where messages having a message type are sent without knowledge of radio frequency conditions for individual ones of user equipment within the cell, measured radio frequency conditions of multiple user equipment within the cell; means for determining, based on the measured radio frequency conditions, a minimum control channel coding rate for a control channel for messages having the message type; and means for causing, subsequent to a determination of the minimum control channel coding rate, transmission toward all user equipment in the cell of the messages having the message type using the determined minimum control channel coding rate for the control channel. A further example is another apparatus comprising the apparatus in this paragraph and means for performing any of examples 2-18.

An additional example embodiment includes a computer program, comprising code for performing the methods of Examples 1 to 18, when the computer program is run on a processor. The computer program according to this paragraph, wherein the computer program is a computer program product comprising a computer-readable medium bearing computer program code embodied therein for use with a computer.

An example apparatus includes one or more processors and one or more memories including computer program code. The one or more memories and the computer program code are configured to, with the one or more processors, cause the apparatus to perform any of the methods of examples 1 to 18.

An example computer program product includes a computer-readable storage medium bearing computer program code embodied therein for use with a computer. The computer program code includes code for performing any of the methods of examples 1-18.

Although examples above mainly describe PDCCH and PDSCH, the embodiments herein are also applicable to other control channels or data bearing channels, respectively.

Some examples of embodiments of the invention differ from conventional approaches at least in the following ways:
  Current systems use a fixed number of PDCCH CCEs for these messages; and/or
  Current systems use a fixed PDSCH encoding for these messages.

Some examples of impacts and technical effects of certain of the embodiments herein are as follows:
  Primary impact: To automatically configure messages to reduce the PDCCH impact if the RF conditions of the site allow; and
  Secondary impact: To automatically configure the PDSCH coding to reduce the impact on the PDSCH capacity.

Without in any way limiting the scope, interpretation, or application of the claims appearing below, a technical effect of one or more of the examples of the embodiments disclosed herein is to improve PDCCH (e.g., and also PDSCH) usage for highly loaded cells. Another technical effect of one or more of the examples of the embodiments disclosed herein is making more efficient use of the PDCCH (e.g., and PDSCH) resources. Another technical effect of one or more of the examples of the embodiments disclosed herein is using RF measurements to determine a minimum PDCCH coding rate, e.g., and a minimum PDSCH coding rate for message types sent without knowledge of the UE's RF conditions and sending messages for the message types on the PDCCH and, e.g., the PDSCH.

At least some embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain or store the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:
  3GPP third generation part
  AWGN additive white Gaussian noise
  BCCH broadcast control channel
  BLER block error rate
  CCE channel control elements
  CCCH common control channel
  C/I carrier-to-interference ratio
  CFI control format indicator
  C-SON centralized self-organizing network
  CQI channel quality indicator
  dB decibels
  DCCH dedicated control channel
  DCI downlink control information
  DL downlink (from base station to user equipment)
  D-SON decentralized self-organizing network
  DTCH dedicated traffic channel
  eNB or eNodeB LTE base station, evolved Node B
  GPC group power control
  HARQ hybrid automatic repeat request
  LTE long term evolution
  MCS modulation and coding scheme
  MHz mega-Hertz
  MLB mobility load balancing
  MME mobility management entity
  PCFICH physical control format indicator channel
  PDCCH physical downlink control
  PDSCH physical downlink shared channel
  PDU protocol data unit
  PHR power headroom report PRB physical resource block
PUCCH physical uplink control channel
PUSCH physical uplink shared channel
RAN radio access network
Rel release
RF radio frequency
RRC radio resource control
Rx receiver
SGW serving gateway
SINR signal to interference plus noise ratio
SON self-organizing network
SRS sounding reference signal
TS technical specification
Tx transmission
UE user equipment
UL uplink (from user equipment to base station)

What is claimed is:

1. A method comprising:
accessing measured radio frequency conditions of multiple user equipment within a cell, wherein messages having a generic message type are sent without knowledge of radio frequency conditions for individual ones of user equipment within the cell, the radio frequency conditions being measured by accumulating samples of radio frequency statistics until a threshold amount of samples has been gathered and by determining a distribution tail operating point from the accumulated samples;
determining, based on the measured radio frequency conditions when the threshold amount of samples has been gathered and based on the determined distribution tail operating point, a minimum control channel coding rate for a control channel for messages having the generic message type; and
causing, subsequent to a determination of the minimum control channel coding rate, transmission of the messages having the generic message type using the determined minimum control channel coding rate for the control channel toward all user equipment in the cell.

2. An apparatus comprising:
one or more processors; and
one or more memories including computer program code, the one or more memories and the computer program code configured, with the one or more processors, to cause the apparatus to perform at least the following:
accessing measured radio frequency conditions of multiple user equipment within a cell, wherein messages having a generic message type are sent by the apparatus without knowledge of radio frequency conditions for individual ones of user equipment within the cell, the radio frequency conditions being measured by accumulating samples of radio frequency statistics until a threshold amount of samples has been gathered and by determining a distribution tail operating point from the accumulated samples;
determining, based on the measured radio frequency conditions when the threshold amount of samples has been gathered and based on the determined distribution tail operating point, a minimum control channel coding rate for a control channel for messages having the generic message type; and
causing, subsequent to a determination of the minimum control channel coding rate, transmission of the messages having the generic message type using the determined minimum control channel coding rate for the control channel toward all user equipment in the cell.

3. The apparatus of claim 2, wherein the one or more memories and the computer program code are further configured, with the one or more processors, to cause the apparatus to perform at least the following:
setting, without a determination of the radio frequency conditions, an initial control channel coding rate for the control channel for the messages having the generic message type, wherein the setting is performed prior to the determining of the minimum control channel coding rate, and wherein the determined minimum control channel coding rate replaces the initial control channel coding rate.

4. The apparatus of claim 2, wherein accumulating the radio frequency statistics accumulates radio frequency statistics for one or more of the following:
downlink modulation and coding scheme usage distribution;
channel quality indicator distribution;
uplink pathloss distribution; and
signal to interference plus noise ratio distribution based on sounding reference signals.

5. The apparatus of claim 2, wherein determining the minimum control channel coding rate further comprises computing signal to interference plus noise based on the distribution tail operating point for the generic message type and determining the minimum control channel coding rate using the computed signal to interference plus noise.

6. The apparatus of claim 5, wherein determining the minimum control channel coding rate further comprises adjusting the computed signal to interference plus noise based on a number of times the messages having the generic message type are sent to all the user equipment in the cell.

7. The apparatus of claim 2, wherein the distribution tail operating point is selected so that a certain percentage of user equipment in the cell will be covered by use of the minimum control channel coding rate in response to performing the transmission of the messages having the generic message type.

8. The apparatus of claim 2, wherein:
the one or more memories and the computer program code are further configured, with the one or more processors, to cause the apparatus to perform at least the following:
prior to determining the minimum control channel coding rate and prior to causing transmission of the messages having the generic message type using the determined minimum control channel coding rate for the control channel, setting an initial control channel coding rate, and causing the transmission to all user equipment in the cell the messages having the generic message type using the initial control channel coding rate; and
the determined minimum control channel coding rate is different from the initial control channel coding rate.

9. The apparatus of claim 2, wherein the control channel is a physical downlink control channel.

10. The apparatus of claim 9, wherein the minimum control channel coding rate is one of a plurality of channel control elements aggregation levels.

11. The apparatus of claim 10, wherein there are a plurality of different generic message types, each generic message type is limited to a number of different channel control elements aggregation levels, and the determining the minimum control channel coding rate for the control channel takes into consideration the number of different channel control elements aggregation levels for the generic message type.

12. The apparatus of claim 2, wherein the one or more memories and the computer program code are further configured, with the one or more processors, to cause the apparatus to perform at least the following:

determining, based on the measured radio frequency conditions, a minimum coding rate for a physical downlink shared channel for messages having a second generic message type suitable for the physical downlink shared channel; and causing transmission, responsive to a determination of the minimum coding rate for the physical downlink shared channel, of messages having the second generic message type using the determined minimum coding rate for the physical downlink shared channel.

13. The apparatus of claim 12, wherein the one or more memories and the computer program code are further configured, with the one or more processors, to cause the apparatus to perform at least the following:

setting, without a determination of the radio frequency conditions, an initial coding rate for the physical downlink shared channel for messages having the second generic message type, wherein the setting the initial coding rate for the physical downlink shared channel is performed prior to the determining of the minimum coding rate for the physical downlink shared channel, and wherein the determined minimum coding rate for the physical downlink shared channel replaces the initial coding rate for the physical downlink shared channel.

14. The apparatus of claim 12, wherein the second generic message type is at least one of the following: paging; initial call setup; and broadcast.

15. The apparatus of claim 2, comprising a base station, wherein the base station measures the radio frequency conditions of the multiple user equipment within the cell prior to accessing the radio frequency conditions and performs transmission of the messages having the generic message type using the determined minimum control channel coding rate for the control channel.

16. The apparatus of claim 2, comprising a self-organizing server.

17. A computer program product comprising a non-transitory computer-readable storage medium bearing computer program code embodied therein for use with a computer, the computer program code comprising:

code for accessing measured radio frequency conditions of multiple user equipment within a cell, wherein messages having a generic message type are sent without knowledge of radio frequency conditions for individual ones of user equipment within the cell, the radio frequency conditions being measured by accumulating samples of radio frequency statistics until a threshold amount of samples has been gathered and by determining a distribution tail operating point from the accumulated samples;

code for determining, based on the measured radio frequency conditions when the threshold amount of samples has been gathered and based on the determined distribution tail operating point, a minimum control channel coding rate for a control channel for messages having the generic message type; and code for causing, subsequent to a determination of the minimum control channel coding rate, transmission of the messages having the generic message type using the determined minimum control channel coding rate for the control channel toward all user equipment in the cell.

18. The apparatus of claim 2, wherein the generic message type is at least one of the following: paging; broadcast control channel; group power control; and call set up messaging.

\* \* \* \* \*